US006032519A

United States Patent [19]
Ishii et al.

[11] Patent Number: 6,032,519
[45] Date of Patent: Mar. 7, 2000

[54] THROTTLE OPENING DEGREE DETECTION APPARATUS

[75] Inventors: Shigeru Ishii; Masashi Sugiuchi; Mitsuru Fujioka, all of Kanagawa, Japan

[73] Assignee: Nissan Motor Co., Ltd., Yokohama, Japan

[21] Appl. No.: 08/975,196

[22] Filed: Nov. 20, 1997

[30] Foreign Application Priority Data

Nov. 21, 1996 [JP] Japan .................................... 8-310725

[51] Int. Cl.[7] .................................................... G01M 15/00
[52] U.S. Cl. ............................................................ 73/117.3
[58] Field of Search .................................... 73/116, 117.3, 73/118.1, 118.2, 117.2

[56] References Cited

U.S. PATENT DOCUMENTS

| | | | |
|---|---|---|---|
| 4,989,147 | 1/1991 | Ishii | 364/424.1 |
| 5,024,197 | 6/1991 | Nakamura | 123/339 |
| 5,157,956 | 10/1992 | Isaji et al. | 73/118.1 |
| 5,586,534 | 12/1996 | Fujimoto | 73/117.3 |

FOREIGN PATENT DOCUMENTS 7-92138 10/1995 Japan .

*Primary Examiner*—Eric S. McCall
*Attorney, Agent, or Firm*—Foley & Lardner

[57] ABSTRACT

A throttle opening degree detection apparatus installed to an engine of a vehicle comprises a idle-up section which directly changes a throttle value opening degree to improve an engine starting characteristic under an engine cold condition and a sensor device which detects the operation of the idle-up section. The apparatus further includes a first learning section which updates a full close reference value under inoperative condition of the idle-up section and a second learning section which updates the full close reference value under idle-up section operating condition. The apparatus calculates a throttle opening degree on the basis of a difference between a throttle detection signal of a throttle sensor and the full close reference value.

8 Claims, 3 Drawing Sheets

THROTTLE OPENING DEGREE DETECTION APPARATUS

The contents of Application No. 8-310725, with a filing date Nov. 21, 1996 in Japan, are hereby incorporated by reference.

BACKGROUND OF THE INVENTION

The present invention relates to improvements in a throttle opening degree detection apparatus which detects a throttle opening degree on the basis of a signal outputted from a throttle sensor.

Generally, a throttle sensor, which outputs a signal according to an opening degree of a throttle value, outputs a dispersion including signal in a full close condition due to a dispersion of a sensor circuit or dispersion of an assembled position among individuals. Therefore, in case that the opening degree of the throttle valve is obtained on the basis of a difference between the full close reference value including dispersion and the output signal of the throttle sensor, it is necessary to cancel the dispersion of the full close reference value. Japanese Patent Publication No. 7-92138 discloses a method for canceling the dispersion of the full close reference value among individuals where an output signal of a throttle sensor under a condition that the throttle valve is mechanically put in a full closed condition is obtained by a leaning control as a learnt full close value. The leant full close value is used as a full close reference value to calculate the throttle opening degree so as to cancel the dispersion.

However, since the above-mentioned learning method is arranged to learn the output signal of the throttle sensor under a condition that the throttle value is mechanically put in a full close condition and to set it as the full close reference value, in case of a throttle value provided with a FIC (Fast Idle Cam) mechanism for directly opening and closing the throttle value in order to improve the starting characteristics in an engine cold condition, the throttle value may not be put in the full close condition due to the operation of the FIC mechanism. This operation of the FIC mechanism prevents the learning of the full close reference value and obliges to calculate the throttle opening degree on the basis of a previously stored initial value. Therefore, in case that the throttle opening degree is detected on the basis of the difference between the initial value of the full close reference value and the output signal of the throttle sensor, the opening degree of the throttle value under the opening operation of the FIC mechanism such as 0.5/8 opening degree is recognized as the throttle opening degree. Therefore, even when the driver does not depress an acceleration pedal, the conventional apparatus may recognize that the operation of the acceleration pedal is executed. This erroneous recognition may affect the control of the automatic transmission.

SUMMARY OF THE INVENTION

It is an object of the present invention to provide an improved throttle opening degree detection apparatus which detects a proper opening degree of a throttle valve even when an idle-up section is operating.

A throttle opening degree detection apparatus according to the present invention is arranged to properly detect an opening degree of a throttle valve of an engine provided with an idle-up section which directly changes an opening degree of said throttle valve for improving a starting characteristic of the engine. A throttle sensor connected with the throttle valve outputs a signal according to the opening degree of the throttle valve. A full close condition detecting section detects whether the throttle value is put in a full close condition without using the signal of the throttle sensor. A first learning section learns a full close reference value on the basis of the signal of said throttle sensor when the full close condition means decides that the throttle value is put in the full close condition. A second learning section learns the full close reference value on the basis of the signal of said throttle sensor when said idle-up section opens the throttle valve. An opening degree detecting section calculates the opening degree of the throttle valve on the basis of a difference between the signal of the throttle sensor and the full close reference value.

DETAILED DESCRIPTION OF THE INVENTION

Figure 1:
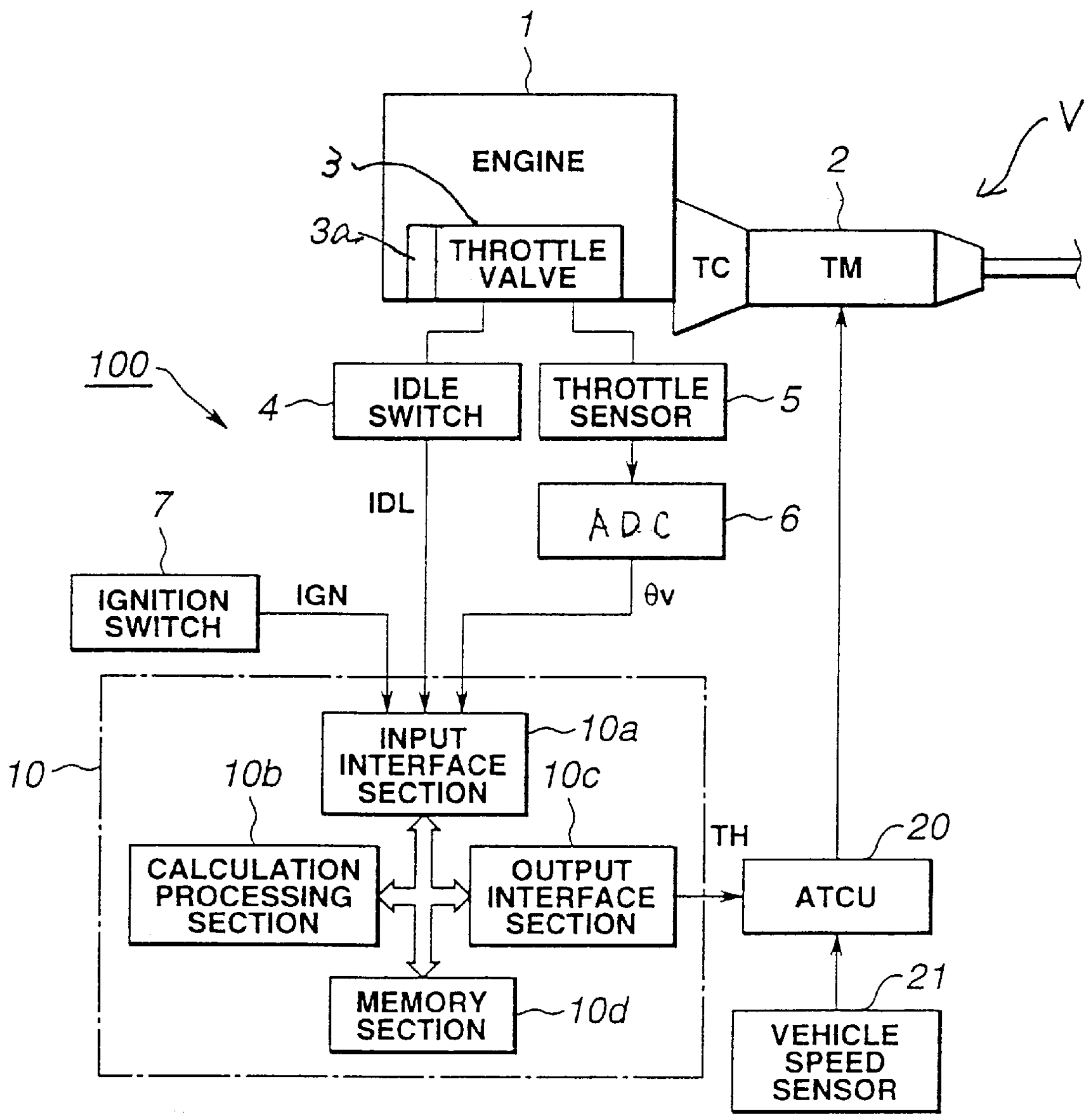
FIG. 1 is a schematic block diagram which shows an embodiment of a throttle opening degree detection apparatus according to the present invention.
Figure 2:
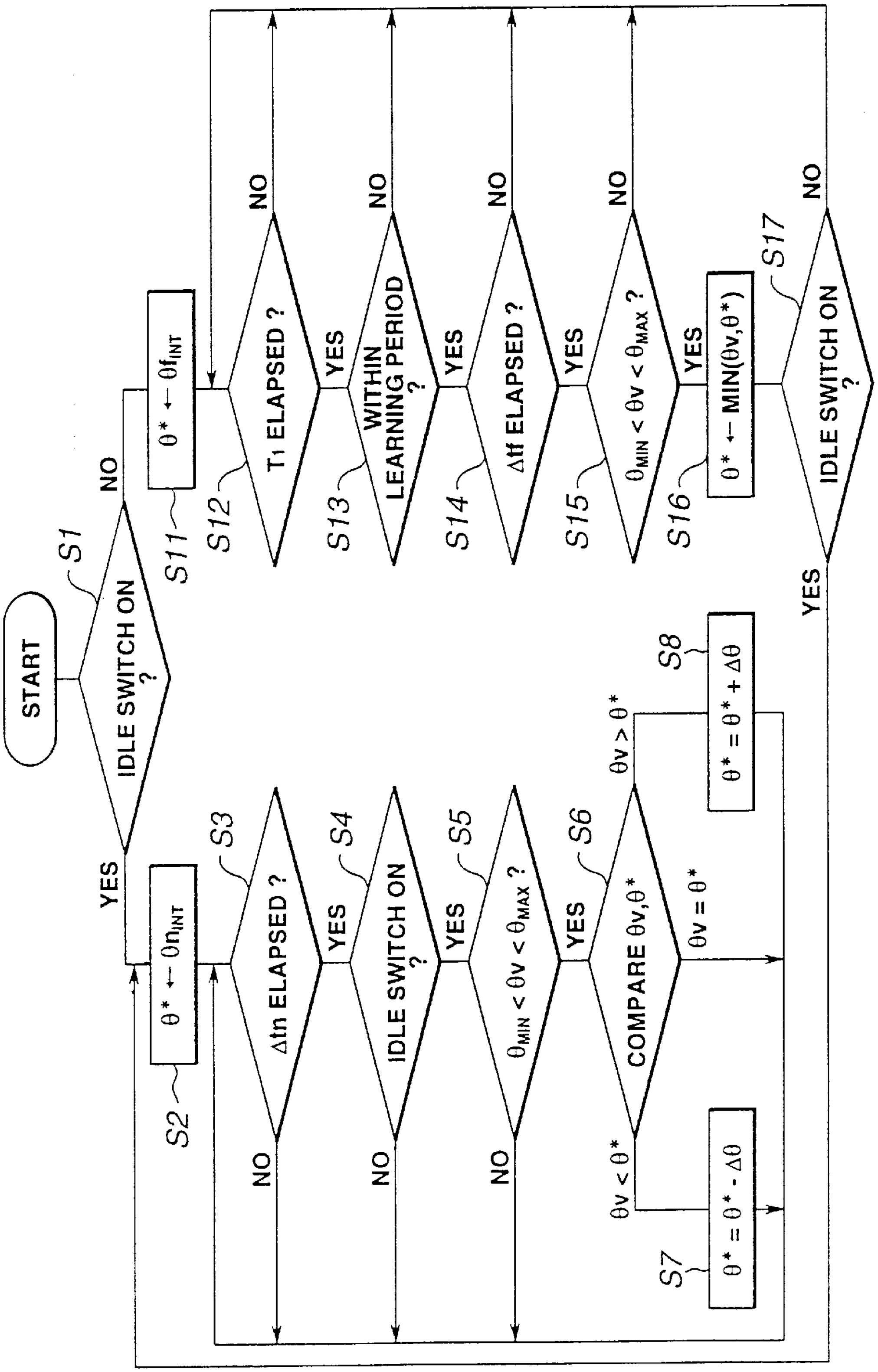
FIG. 2 is a flowchart which shows a reference value setting process executed by a detection unit of FIG. 1.
Figure 3:
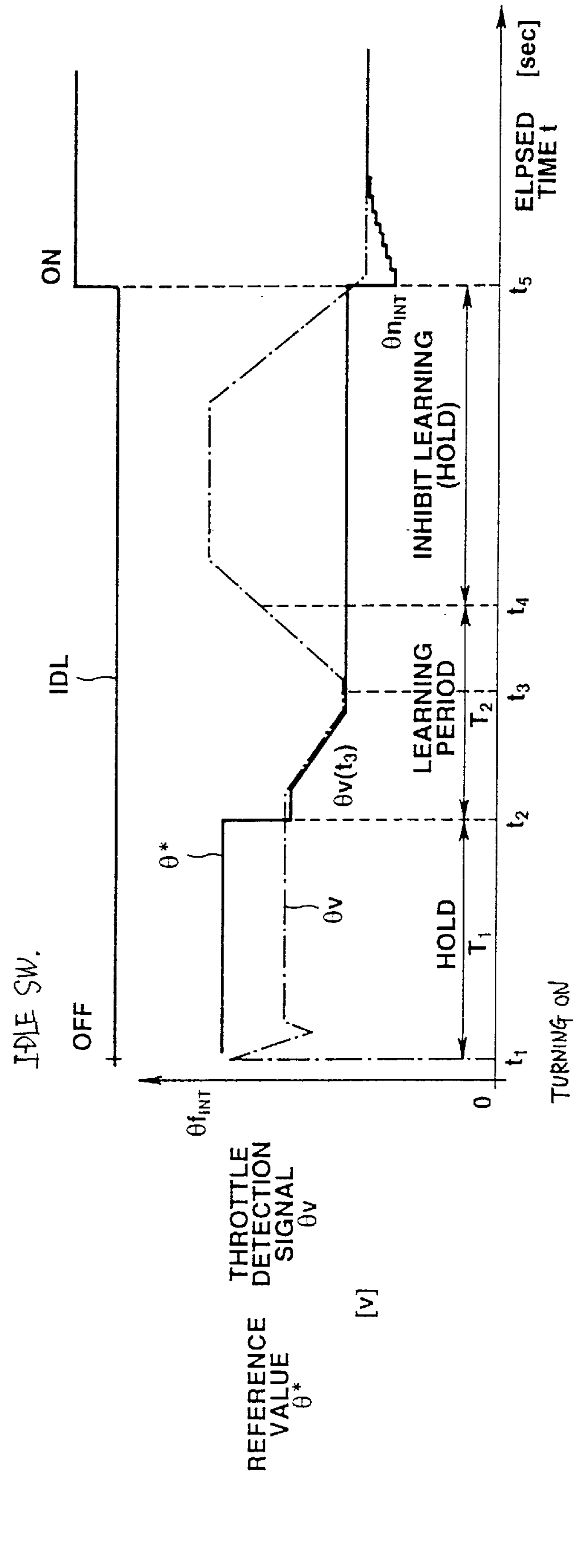
FIG. 3 is a graph which shows operation of the throttle opening degree detection apparatus according to the present invention.

Referring to FIGS. 1 to 3, there is shown an embodiment of a throttle opening degree detecting apparatus according to the present invention.

As shown in FIG. 1, the throttle opening degree detecting apparatus 100 according to the present invention is installed to an engine 1 of a vehicle V. An automatic transmission 2 is connected to an output shaft of the engine 1. The automatic transmission 2 is constituted by a torque converter TC with a lockup mechanism such as a lockup piston and a transmission mechanism TM. An input end of the torque converter TC is connected with the output shaft of the engine 2, and an output end of the torque converter TC is connected with the transmission mechanism TM.

A throttle valve 3 of the engine 1 is provided with a thermo-wax FIC mechanism 3*a* of a hot-water heated type which mechanism functions as an idle up means. The FIC mechanism 3*a* is arranged to directly open and close the throttle valve 3 according to the temperature of cooling water of the engine 1 so as to improve a cold start performance of the engine 1.

An idle switch 4 functioning as a full close condition detecting means and a throttle sensor 5 are connected with the throttle valve 3. The idle switch 4 is arranged to output an idle signal IDL when the throttle valve 3 is mechanically put in the full close condition. The throttle sensor 5 outputs a voltage signal in proportion with an opening degree of the throttle valve 3. The idle signal IDL outputted from the idle switch 4 is directly inputted to a detection unit 10. The voltage signal outputted from the throttle sensor 5 is sent to an analog-to-digital converter (ADC) 6 wherein the voltage signal is converted into a digital signal and inputted to the detection unit 10 as a throttle detection signal $\theta_v$. An ignition switch 7, by which an ignition system of the engine 1 is caused to function, outputs an operation signal IGN indicative of an operating condition of the engine 1 when the engine is operating.

The detection unit 10 comprises an input interface section 10*a*, a calculating section 10*b*, an output interface section 10*c* and a memory section 10*d*. The input interface section 10*a* is connected with the idle switch 4, the ADC 6 and the ignition switch 7 and receives the idle signal IDL, the throttle detection signal $\theta_v$ and the operation signal IGN, respectively. The calculating section 10*b* calculates a throttle opening degree TH by executing predetermined processes on the basis of the signals IDL, $\theta_v$ and IGN. The calculated throttle opening degree TH is outputted to an automatic transmission control unit (ATCU) 20 through the output interface section 10*c*. The memory section 10*d* has previously stored a program for calculating the throttle opening degree TH, predetermined constants and so on.

The detection unit 10 receives the idle signal IDL, the throttle detection signal $\theta_v$ and the ignition signal IGN and decides as to whether the FIC mechanism 3*a* is put in an inoperative condition on the basis of the signals IDL, $\theta_v$ and IGN. When the engine 1 is operating and when the idle switch 4 is turned ON to output the idle signal IDL indicative that the throttle valve 3 is put in the full close condition, the detection unit 10 decides that the FIC mechanism 3*a* is put in the inoperative condition. Under this inoperative condition of the FIC mechanism 3*a*, the detection unit 10 sets a full close reference value at a value as is similar to that in a conventional apparatus. That is, an initial value $\theta n_{INT}$ which is an initial value of a full close reference value in a full close condition of the throttle valve 3 and is stored in the memory section 10*d*, is set as the full close reference value $\theta^*$. Hereinafter, the full close reference value $\theta^*$ is controlled to track to the throttle detection signal $\theta_v$ under a condition that the idle signal IDL is outputted, that is, under the full close condition of the throttle valve 3. The tracking control of the full close reference value $\theta^*$ is executed by using a predetermined variation $\Delta\theta$ which has be previously determined.

On the other hand, in case that the idle signal IDL is OFF after the engine 1 is started, that is, in case that the throttle valve 3 is not put in the full close condition, the detection unit 10 decides that the FIC mechanism 3*a* is operating and that the throttle value 3 is opened in some degree by the FIC mechanism 3*a*. In this case, the detection unit 10 sets the initial value $\theta f_{INT}$, which is an initial value of the full close reference value when the FIC mechanism 3*a* is operating, as the full close reference value $\theta^*$. Hereinafter, a minimum value of the throttle detection value $\theta_v$ during a predetermined learning period is set as the full close reference value $\theta^*$.

The initial value $\theta n_{INT}$ under the full close condition of the throttle valve 3 has been, for example, set at an average value which has been previously obtained by measuring the average of the throttle detection signal $\theta_v$ under the full close condition of the throttle valve 3. Further, the initial value $\theta f_{INT}$ under the operating condition of the FIC mechanism 3*a* has been, for example, set at the maximum value of the throttle detection value $\theta_v$ which has been obtained when the throttle value 3 is opened by the operation of the FIC mechanism 3*a*.

The detection unit 10 calculates the throttle opening degree TH of the throttle valve 3 on the basis of the difference between the set full close reference value $\theta^*$ and the inputted throttle detection signal $\theta_v$, and outputs the calculated throttle opening degree TH to the ATCU 20. The ATCU 20 sets the shifting point and the lockup speed of the automatic transmission 2 on the basis of the throttle opening degree TH and a vehicle speed inputted from the vehicle speed sensor 21 to execute the shift control of the automatic transmission 2.

Next, the manner of operation of the throttle opening degree detection apparatus according to the present invention will be discussed with reference to a flowchart of FIG. 2.

The flowchart of FIG. 2 shows an example of a processing procedure of the reference value setting process for setting the full close reference value $\theta^*$ at the calculating section 10*c*. When the ignition switch 7 is turned ON, the calculating section 10*c* starts to execute the reference value setting process.

At a step S1, the calculating section 10*c* decides as to whether the idle switch 4 is turned ON or not on the basis of the idle signal IDL from the idle switch 4, that is, decides whether the throttle valve 3 is put in the full close condition or not. When the FIC mechanism 3*a* is put in the inoperative condition and when a driver of the vehicle does not depress an acceleration pedal, the throttle value 3 is put in the full close condition. Therefore, in this case, the idle signal IDL indicates an ON condition of the idle switch 4. When the decision as the step S1 is YES, that is, when the idle switch 4 is turned ON to output ON signal of the idle signal IDL, the routine proceeds to a step S2 to execute the reference value setting process under the inoperative condition of the FIC mechanism 3*a*. That is, the reference value is set as is the same as that of the normal condition. This reference value setting process corresponds to a learning means. On the other hand, when the decision at the step S1 is NO, the routine proceeds to a step S11 to execute the reference value setting process under the operating condition of the FIC mechanism 3*a*.

At the step S2, the initial value $\theta n_{INT}$ under the full close condition, which value has been previously stored in the memory section 10*d*, is set as the full close reference $\theta^*$.

Following to the step S2, the routine proceeds to a step S3 wherein it is decided as to whether a predetermined time period $\Delta tn$ such as 40 msec has elapsed after the setting of the full close reference value $\theta^*$. When the decision of the step S3 is YES, the routine proceeds to a step S4. When the decision at the step S3 is NO, the routine repeats the step S3 until the predetermined time period elapses.

At the step S4, it is again decided as to whether the idle switch 4 is put in an ON condition or not. When the decision at the step S4 is YES, the routine proceeds to a step S5. When the decision at the step S4 is NO, the routine returns to the step S3.

At the step S5, the detection unit 10 reads the throttle detection signal $\theta_v$ and decides as to whether the throttle detection signal $\theta_v$ is within a range from a lower limit $\theta_{MIN}$ to an upper limit $\theta_{MAX}$. When the decision at the step S5 is YES ($\theta_{MIN}<\theta_v<\theta_{MAX}$), the routine proceeds to a step S6. When the decision at the step S5 is NO, the routine returns to the step S3. The lower limit $\theta_{MIN}$ and the upper limit $\theta_{MAX}$ are a minimum value and a maximum value of the throttle detection value $\theta_v$ under a condition that the throttle sensor 5 is correctly operating without a trouble such as open circuit or short circuit. That is, by the execution of the step S5, the incorrect output signal $\theta_v$ under the troubled condition of the throttle sensor 5 is prevented from being set as the full close reference value.

At the step S6, the throttle detection value $\theta_v$ is compared with the full close reference value $\theta^*$. When it is decided at the step S6 that the throttle detection value $\theta_v$ is greater than the full close reference value $\theta^*$ ($\theta_v<\theta^*$), the routine proceeds to a step S7 wherein the full close reference value $\theta^*$ is decreased by a predetermined value $\Delta\theta$ ($\theta^*=\theta^*-\Delta\theta$). When it is decided at the step S6 that the throttle detection value $\theta_v$ is equal to the full close reference value $\theta^*$ ($\theta v=\theta^*$), the routine returns to the step S3 without the execution of the updating process for the full close reference value, that is, while the full close reference value $\theta^*$ is held. When it is decided at the step S6 the throttle detection value $\theta_v$ is larger than the full close reference value $\theta^*$ ($\theta_v>\theta^*$), the routine proceeds to a step S8 wherein the full close reference value $\theta^*$ is increased by the predetermined value $\Delta\theta$ ($\theta^*=\theta^*+\Delta\theta$). Following to the execution of each of the steps S7 and S8, the routine returns to the step S3.

When a predetermined time period $\Delta tn$ has elapsed at the step S3 after the execution of the updating operation of the full close reference value corresponding to the steps S7 to S8, the detection unit 10 decides at the step S4 whether the idle switch 4 is put in the ON condition or not. When the idle switch 4 is put in the ON condition, the detection unit 10 decides that the throttle valve 3 is put in the full close condition. Following to this YES decision at the step S4, the routine proceeds to the step S5 wherein the detection unit 10 reads the throttle detection signal $\theta_v$ and decides as to whether the throttle detection signal $\theta_v$ is within the range from the lower limit $\theta_{MIN}$ to the upper limit $\theta_{MAX}$, or not. On the basis of the magnitudinous relationship between the throttle detection signal $\theta_v$ and the full close reference value $\theta^*$, the full close reference value $\theta^*$ is increased or decreased by the predetermined amount $\Delta\theta$. If they are equal with each other, the update of the full close reference value is not executed.

By repeating this process, the full close reference value $\theta^*$ is changed by the predetermined amount so as to follow up the throttle detection signal $\theta_v$ in the full close condition of the throttle valve 3. This process is finished, for example, when the ignition switch 7 is put in an OFF condition.

For example, when a driver depresses an acceleration pedal for starting the vehicle, the idle switch 4 is put in the OFF condition corresponding to the NO decision at the step S4. At this time, since the throttle value 3 is opened, the updating of the full close reference value $\theta^*$ is not executed. Further, in case that the throttle detection signal $\theta_v$ is not within the range from the lower limit $\theta_{MIN}$ to the upper limit $\theta_{MAX}$, the detection unit 10 decides that the throttle detection signal $\theta_v$ is non-effective (invalid) and therefore the updating of the full close reference value $\theta^*$ is not executed.

On the other hand, when the FIC mechanism 3*a* is operating due to the cold condition of the engine 1 in case that the engine 1 is started, the throttle valve 3 is controlled at an opening state. Therefore, even if the driver does not depress the acceleration pedal, the idle switch 4 is kept at an OFF state. Accordingly, in this case the calculating section 10*b* starts the reference value setting process under the operating condition of the FIC mechanism 3*a* corresponding to an idle-up learning means. That is, the decision at the step S1 becomes NO, and therefore the routine proceeds to the step S11 wherein the initial value $\theta f_{INT}$ under the FIC mechanism 3*a* operating condition, which value has been previously stored in the memory section 10*d*, is set as the full close reference value $\theta^*$.

Following to the execution of the step S11, the routine proceeds to a step S12 wherein it is decided as to whether a predetermined time $T_1$ such as 2 seconds has elapsed from the turning ON of the ignition switch 7 or not. When the decision at the step S12 is YES, the routine proceeds to a step S13. When the decision at the step S12 is NO, the routine repeats the step S12 until the predetermined time period $T_1$ elapses. The time period $T_1$ is a time period necessary for stabilizing the fluctuation of the throttle detection signal $\theta_v$ which fluctuation is caused by the switching transient condition of the throttle sensor 5. The learning period is, for example, a time period from time that a time period $T_1$ elapsed after the turning on of the ignition switch 7 to time that a predetermined time period $T_2$ such as 1.5 sec elapsed. The predetermined time period $T_2$ is a time period from time that the fluctuation of the throttle detection signal $\theta_v$ at a starting of the engine is stabilized to time that the throttle detection signal $\theta_v$ starts to be changed according to the operation of an external electric-power equipment such as an auxiliary equipment. That is, the predetermined time period $T_2$ is a period that it is decided that the throttle signal $\theta_v$ is stable.

Next, when the predetermined time period $T_1$ elapsed after the turning on of the ignition switch 7, that is, when the decision at the step S12 becomes YES, the routine proceeds to a step S13.

At the step S13 the detection unit 10 decides as to whether it is within learning period or not. When the detection unit 10 decides that it is within the learning period, the routine proceeds to a step S14. When the detection unit decides that it is not within the learning period, the routine returns to the step S12.

At the step S14 the detection unit 10 decides as to whether a predetermined time period $\Delta tf$ elapsed from the time of the setting of the full close reference value $\theta^*$ or not. When the decision at the step S14 is YES, the routine proceeds to a step S15. When the decision at the step S14 is NO, the routine returns to the step S12.

At the step S15 the detection unit 10 reads the throttle detection signal $\theta_v$ and decides as to whether the throttle detection signal $\theta_v$ is within a range from the lower limit $\theta_{MIN}$ to the upper limit $\theta_{MAX}$ or not. When $\theta_{MIN}<\theta_v<\theta_{MAX}$, the detection unit 10 decides that the throttle detection signal $\theta_v$ is an effective value. Therefore, the routine proceeds to a step S16. When the decision at the step S15 is NO, the routine returns to the step S12.

At the step S16 the detection unit 10 sets a smaller one of the throttle detection signal $\theta_v$ and the present full close reference value $\theta^*$ as the full close reference value $\theta^*$.

At a step S17 the detection unit 10 decides as to whether the idle switch 4 is put in the ON condition or not. When the decision at the step S17 is YES, the routine returns to the step S2. When the decision at the step S17 is NO, the routine returns to the steep S12.

That is, in the condition that the idle switch 4 is put in the OFF condition and the detection unit 10 decides that it is within the learning period, when the throttle detection signal $\theta_v$ is within the predetermined range from $\theta_{MIN}$ to $\theta_{MAX}$, the detection unit 10 compares the read throttle detection signal $\theta_v$ and the full close reference value $\theta^*$ to select smaller one therebetween. Then, the stored full close reference value $\theta^*$ is updated by the smaller one.

In this process, when the throttle detection signal $\theta_v$ is out of the predetermined range from $\theta_{MIN}$ to $\theta_{MAX}$, the detection unit 10 decides that the throttle detection signal $\theta_v$ is not effective, and the updating of the full close reference value $\theta^*$ is not executed.

When a predetermined time period $T_1$ elapsed after the turning on of the ignition switch 7 and further the predetermined time period $T_2$ elapsed, that is, when the leaning period elapsed, the full close reference value $\theta^*$ during the FIC operating condition is not updated thereafter. Then, when the opening operation of the throttle valve 3 by the FIC mechanism 3*a* is finished and the idle switch 4 is turned ON, the reference value setting process during the FIC mechanism operation is finished, and the reference value setting process during the inoperative condition of the FIC mechanism 3*a* is started. Then, when the ignition switch 7 is turned OFF, the process during the inoperative condition of the FIC mechanism 3*a* is finished.

With reference to FIG. 3, the changes of the full close reference value θ* and the throttle detection value $\theta_v$ in accordance the elapsed time will be discussed.

In FIG. 3, an axis of abscissa represents elapsed time t (second), a heavy continuous line represents a full close reference value θ* (V), a dot and dash line represents the throttle detection value $\theta_v$, and a fine represents ON-OFF condition of the idle switch 4.

As shown in FIG. 3, in case that the ignition switch 7 is turned on at time $t_1$, if the FIC mechanism 3*a* is operating at the time $t_1$, the idle switch 4 is put in the OFF condition. Therefore, The process during the FIC operation is executed to set the initial value $\theta f_{INT}$ as the full close reference value θ*. During a period from the time $t_1$ to time $t_2$ that the predetermined time period $T_1$ elapsed, the updating of the full close reference value θ* is not executed. That is, although the throttle detection signal $\theta_v$ outputted from the throttle sensor 5 is fluctuated at the time $t_1$ starting the engine, during such a period between the time $t_1$ to the time $t_2$ the learning of the full close reference value θ* is not executed. Therefore, such throttle detection signal $\theta_v$ including the starting fluctuation never be set as the full close reference value θ*.

Next, when the predetermined time period $T_1$ elapsed after the turning on of the ignition switch 7 and it is the time $t_2$, the learning of the full close reference value θ* is executed at predetermined intervals such as predetermined time periods Δtf. When the smaller one between the throttle detection signal $\theta_v$ within the range from the lower limit $\theta_{MIN}$ to the upper limit $\theta_{MAX}$ and the full close reference value θ* is set as the full close reference value θ*.

That is, although the throttle detection signal $\theta_v$ is fluctuated by the operation of an auxiliary equipment of the external electric power equipment at about the time $t_4$, during such a period from the time $t_4$ to the time $t_5$ the leaning of the full close reference value is not executed. Therefore, such throttle detection signal $\theta_v$ including such fluctuation is not set as the full close reference value θ*.

Next, even when the throttle valve 3 is put in the full close condition, the learning operation is inhibited until time $t_5$. At the time $t_5$, the operation of the FIC mechanism 3*a* is finished according to the warming of the engine 1, and the throttle valve 3 is fully closed. In reply to this full close operation, the idle switch 4 is turned on. Therefore, the detection unit 10 starts to execute the reference value setting process during the FIC mechanism inoperative condition. First, the initial value $\theta n_{INT}$ under the full close condition is set as the full close reference value. Thereafter, the full close reference value is updated by a predetermined amount Δθ at predetermined time intervals Δtn so as to in turn track the value of the throttle detection value at each time.

The set full close reference value θ* is defined as the throttle opening degree 0/8, and the throttle opening degree TH is calculated from the difference between the full close reference value θ* and the inputted throttle detection signal $\theta_v$. The calculated throttle opening degree TH is sent to the ATCU 20 where the shift control of the automatic transmission 2 is executed on the basis of the received throttle opening degree TH. Accordingly, the dispersion of the full close reference value due to the coherent error of the circuit of the throttle sensor 5 or error during the assembly of the throttle sensor 5 is cancelled, and it becomes possible to properly set the full close reference value θ* according to the condition of the throttle valve 3 and the throttle sensor 5.

When the FIC mechanism 3*a* is operating, the detection unit 10 executes so as to set the minimum throttle detection value $\theta_v$ under the FIC mechanism operating condition within the learning period, as the full close reference value θ*. By detecting the throttle opening degree TH on the basis of the full close reference value θ*, when the acceleration pedal is put in the released condition, the detection unit 10 firmly avoids an erroneous detection that the throttle valve 3 is opened by the driver.

Since the learning process of the full close reference value θ* is executed only during a predetermined learning period, it becomes possible to avoid the throttle detection signal including noises due to the starting of the engine or the operation of an auxiliary equipment from being set as the full close reference value θ*. This enables the throttle opening degree detection apparatus 100 to ensure the highly accurate full close reference value θ* according to the actual throttle opening degree taking account of the operation of the FIC mechanism 3*a*.

Further, since the minimum value obtained during the learning period is set as the full close reference value θ*, it becomes possible to avoid erroneous setting that the throttle detection signal $\theta_v$ including temporal noise or the throttle detection signal during the depression of the acceleration pedal by a driver is set as the full close reference value θ* during the FIC mechanism operating condition. This enables the throttle opening degree detection apparatus 100 to obtain the highly accurate full close reference value according to the actual throttle opening degree taking account of the operation of the FIC mechanism 3*a*.

For example, when the driver depresses the acceleration pedal during the FIC mechanism operating condition, the throttle opening degree TH is obtained on the basis of the difference between the full close reference value θ* and the throttle detection signal $\theta_v$. By this operation, when the throttle value 3 is previously opened by the FIC mechanism 3*a*, the detecting unit 10 recognizes the throttle opening degree of 0.5/8 opening degree as 0/8 opening degree. That is, the detection unit 10 recognizes a value which is small as compared with an actual value as the throttle opening degree. However, since the throttle opening degree detection apparatus 100 according to the present invention is arranged to set the minimum value of the throttle detection signal $\theta_v$ during the learning period as the full close reference value θ* under the FIC mechanism operating condition, the full close reference value θ* is set at a further actual value near the value under the full close condition of the throttle valve 3. This suppresses the error due to the operation of the FIC mechanism 3*a* at minimum.

Since the throttle opening degree detection apparatus 100 is arranged such the full close reference value θ* promptly tracks the value of the throttle detection signal within the learning period, it becomes possible that the full close reference value θ* tracks the present opening degree of the throttle valve 3 at an earlier time. Therefore, it becomes possible to set the full close reference value at the time before the driver depresses the acceleration pedal after the starting of the engine. This improves the accuracy of the throttle opening degree TH during the staring of the vehicle. Accordingly, by the execution of the shift control and the lockup control by the ATCU 20 on the basis of the full close reference value θ*, the accuracy of these controls are improved. This improves the driving stability of the vehicle.

Further, since the throttle opening degree detection apparatus 100 according to the present invention is arranged to detect the operating condition of the FIC mechanism 3*a* on the basis of the operation condition of the idle switch 4 after the ignition switch 7 is turned on, the detection thereof is easily executed without a further provision of new sensors.

Although the preferred embodiment according to the present invention has been shown and described such that a thermo-wax FIC mechanism of a hot-water heated type is employed as the FIC mechanism 3*a*, it will be understood that the FIC mechanism 3*a* to be employed in the present invention is not limited to this and may employ a mechanism arranged to control the opening degree of the throttle valve 3 by controlling a solenoid on the basis of the thermal condition of the engine or mechanism arranged to pull the throttle valve 3 through a wire.

While the preferred embodiment according to the present invention has been shown and described such that the operation of the FIC mechanism is detected on the basis of ON-and-OFF condition of the idle switch 4 at the time after the starting of the engine, it will be understood that such detection may not be limited to this and may be arranged to directly detect the operating condition of the FIC mechanism 3*a*, such that a temperature sensor is provided and the operating condition of the FIC mechanism 3*a* is detected from the temperature condition and the expanded condition of the thermo-wax.

Although the preferred embodiment according to the present invention has been shown and described such that under the FIC mechanism inoperative condition a previously provided initial value of the full close reference value is set as the full close reference value θ*, it will be understood that a full close reference value θ* learnt in the previous starting is stored in a nonvolatile rewritable memory such as P-ROM (Erasable and Programmable ROM) and is used as the initial value in the next starting.

While the preferred embodiment according to the present invention has been shown and described such that the ATCU 20 executes the control of the automatic transmission 2 on the basis of the throttle opening degree TH detected by the throttle opening degree detection apparatus 100 according to the present invention, it will be understood that the throttle opening degree TH obtained by the throttle opening degree detection apparatus 100 according to the present invention is not limited to this and may be applied to the other control apparatus using a throttle opening degree TH to execute a further accurate control.

Although the embodiment according to the present invention has been shown and described such that the control unit is constituted by a microcomputer, it will be understood that the present invention is not limited to this and may be constituted by assembling electronic circuits such as resisters and calculating circuits.

What is claimed is:

1. A throttle opening degree detection apparatus comprising:

a throttle valve of an engine;

idle-up means for directly changing an opening degree of said throttle valve;

a throttle sensor outputting a signal according to the opening degree of said throttle valve;

full close condition detecting means for detecting whether said throttle valve is put in a full close condition without using the signal of said throttle sensor;

first learning means for learning a full close reference value on the basis of the signal of said throttle sensor when said full close condition means decides that said throttle valve is put in the full close condition;

second learning means for setting a minimum value of the signals of said throttle sensor obtained within a period that said idle-up means opens said throttle valve, as the full close reference value; and opening degree calculating means for calculating the opening degree of said throttle valve on the basis of a difference between the signal of said throttle sensor and the full close reference value.

2. A throttle opening degree detection apparatus as claimed in claim 1, wherein said second learning means decides that said throttle valve is opened by said idle-up means when said full close condition detecting means detects that said throttle valve is held in an opened condition after starting of the engine.

3. A throttle opening degree detection apparatus as claimed in claim 1, wherein said second learning means learns the full close reference value only during a predetermined period from time elapsed a first time period after the starting of the engine for a predetermined time period.

4. A throttle opening degree detection apparatus comprising:

a throttle valve of an engine;

a throttle sensor outputting a signal according to the opening degree of said throttle valve;

a fast idle cam mechanism directly changing the opening degree of said throttle valve;

an idle switch outputting an idle signal indicative of the execution of idling of the engine;

an ignition switch outputting an ignition signal indicative of the operation of the engine; and a detection unit arranged to detect whether said throttle valve is put in a full close condition on the basis of the signals from said idle switch and said ignition switch, to learn a full close reference value on the basis of the signal of said throttle sensor when said detection unit detects that said throttle valve is put in the full close condition, to set a minimum value of the signals of said throttle sensor obtained within a period that said fast idle cam mechanism opens said throttle valve, as the full close reference value, and to obtain the opening degree of said throttle valve on the basis of a difference between the signal of said throttle sensor and the full close reference value.

5. A throttle opening degree detection apparatus as claimed in claim 4, wherein said detection unit includes a calculating section for updating the full close reference value and for calculating the throttle opening degree, and a memory section for storing a program and constant values used in the calculating section.

6. A throttle opening degree detection apparatus as claimed in claim 5, wherein said detection unit further includes an input interface section for receiving the signals from said throttle sensor, said idle switch and said ignition switch, and an output interface section for outputting the calculated throttle opening degree.

7. A throttle opening degree detection apparatus as claimed in claim 4, wherein said detection unit outputs the calculated throttle opening degree to an automatic transmission control unit for controlling an automatic transmission connected with the engine.

8. A throttle opening degree detection apparatus comprising:

an engine having a throttle valve;

an automatic transmission connected with said engine;

an automatic transmission control unit executing a shift control and a lockup control of said automatic transmission;

a vehicle speed sensor outputting a speed signal indicative of a speed of a vehicle equipped with said engine to said automatic transmission control unit;

a throttle sensor outputting a signal according to the opening degree of the throttle valve;

a fast idle cam mechanism directly changing the opening degree of the throttle valve;

an idle switch outputting an idle signal indicative of an inoperative condition of said fast idle cam mechanism;

an ignition switch outputting an ignition signal indicative of the operation of the engine;

an analog-to-digital converter converting the signal of said throttle sensor into a corresponding digital signal; and a detection unit arranged to detect whether said throttle valve is put in a full close condition on the basis of the signals from said idle switch and said ignition switch, to update a full close reference value on the basis of the signal of said throttle sensor when said detection unit detects that said throttle valve is put in the full close condition, to detect the opening degree of said throttle valve on the basis of a difference between the signal of said throttle sensor and the full close reference value, to set a minimum value of the signals of said throttle sensor obtained within a period that said fast idle cam mechanism opens said throttle valve, as the full close reference value, and to calculate the opening degree of said throttle valve on the basis of a deference between the signal of said throttle sensor and the full close reference value, said detection unit outputting the throttle opening degree to said automatic transmission control unit.

* * * * *